United States Patent Office 3,410,654
Patented Nov. 12, 1968

3,410,654
PRODUCTION OF LIBERATED POLYPHOSPHORIC
ACID AND CALCIUM SULFATE
Robert A. Wiesboeck and John D. Nickerson, Atlanta,
Ga., assignors, by mesne assignments, to Armour Agricultural Chemical Company, a corporation of Delaware
No Drawing. Filed Sept. 9, 1965, Ser. No. 486,195
19 Claims. (Cl. 23—122)

ABSTRACT OF THE DISCLOSURE

Anhydrous monocalcium orthophosphate or anhydrous dicalcium orthophosphate is heated in the presence of $SO_3$ to a reaction temperature whereby the limited amount of chemically-bound water in the phosphate on reaction with $SO_3$ produces a free or liberated polyphosphoric acid and calcium sulfate and the phosphorus value is separated from the calcium sulfate preferably by ammoniation of the reaction product and by leaching the product with water.

---

This invention relates to the production of polyphosphates, and is particularly useful in the preparation of aqueous solutions of polyphosphates without requiring the thermal concentration of phosphoric acid.

The present procedure for the production of wet process condensed phosphoric acids and condensed phosphate fertilizer solutions requires concentration of dilute phosphoric acid to a minimum of about 72 weight percent $P_2O_5$ in order to produce a substantial amount of the polyphosphate species.

We have discovered that the polyphosphate species can be produced directly from monocalcium or dicalcium orthophospate in the presence of sulfur trioxide without requiring concentration of wet process phosphoric acid above 54 percent $P_2O_5$. Fifty-four percent $P_2O_5$ phosphoric acid is normally used to produce triple superphosphate, the practical source of monocalcium phosphate to be used in our process. By controlling the amount of water in the phosphate reacted with $SO_3$ for liberating a polyphosphoric acid and by employing steps for retaining the polyphosphate species in the final products, we are able to produce a polyphosphate product or polyphosphate-containing solution without thermally concentrating dilute phosphoric acid.

The primary object, therefore, of our process is to produce wet process polyphosphates through the treatment of monocalcium or dicalcium orthophosphates. A further object is to treat anhydrous monocalcium orthophosphate or anhydrous dicalcium orthophosphate with $SO_3$ in such a manner as to produce a liberated polyphosphoric acid and to retain the phosphorus value in the final product. Other specific objects and advantages will appear as the specification proceeds.

In one embodiment of our invention, we heat an anhydrous monocalcium orthophosphate or an anhydrous dicalcium orthophosphate in the presence of $SO_3$ to a reaction temperature whereby the limited amount of water in the phosphate on reaction with $SO_3$ produces a liberated polyphosphoric acid and calcium sulfate, and thereafter separating the phosphorus value from the calcium sulfate. In separating the phosphorus value from the calcium sulfate in the reaction product, the reaction product may be ammoniated and the ammoniated product leached with water to recover the polyphosphates. If desired, the reaction product may be directly leached with an aqueous ammonium hydroxide to produce the polyphosphate product. Further, if desired, the reaction product may be leached with cold water to recover the phosphorus value and retain the reaction product polyphosphate values.

By the foregoing procedures and by taking care to minimize hydrolysis, the reaction mixture can be leached to produce substantial amounts of polyphosphate species, as, for example, solutions of the 10–34–0 type, 0–34–0 type, or of even higher analysis.

Anhydrous monocalcium orthophosphate and dicalcium orthophosphate contain a limited amount of chemically-bound water which on reaction with sulfur trioxide determines the concentration of the liberated phosphoric acid. Accordingly, monocalcium orthophosphate produces the equivalent of pyrophosphoric acid (80% $P_2O_5$) and dicalcium orthophosphate the equivalent of metaphosphoric acid (89% $P_2O_5$) as indicated by the following equations:

$$Ca(H_2PO_4)_2 + SO_3 \rightarrow \text{``}H_4P_2O_7\text{''} + CaSO_4$$
$$CaHPO_4 + SO_3 \rightarrow \text{``}HPO_3\text{''} + CaSO_4$$

By equivalent is meant a phosphoric acid having the standard polyphosphate distribution corresponding to that $P_2O_5$ content.

The reaction with sulfur trioxide requires a minimum starting temperature of 60° and 180° C. for monocal and dical, respectively. Once started, this temperature is readily maintained by the exothermic nature of the reaction.

We prefer to agitate the reaction mixture so as to insure uniform reaction. Also, we prefer to apply the sulfur trioxide in stoichiometric amounts. Concentration (pressure) of the sulfur trioxide may be controlled so as to maintain a reaction temperature between about 100° and 300° C. or above.

To insure that the starting phosphate material, such as monocalcium orthophosphate or dicalcium orthophosphate, is anhydrous, the material may be heated at temperatures of about 120–130° C. or higher to remove the free moisture and water of hydration content, and the dried phosphate then heated and brought into contact with sulfur trioxide.

The reaction product is a hygroscopic semi-solid pliable mixture of calcium sulfate and polyphosphoric acid. It presents an oily appearance. The product is useful for blending in fertilizer materials or as a source for the recovery of polyphosphates or polyphosphoric acid.

The phosphorus value may be recovered in its polyphosphate form by various methods, such as by ammoniating the reaction product and leaching the ammoniated product with water, or by leaching the reaction product directly with aqueous ammonium hydroxide. If desired, the phosphorus value can be recovered in acid form by leaching the reaction product directly with cold water, as, for example, water having a temperature of about 30° C. or lower to prevent significant hydrolysis of polyphosphate species. The phosphorus value can be recovered as a mixture of polyphosphate and orthophosphate salts of ammonium, potassium, sodium or other desirable cations by leaching the reaction product with organic solvents such as ethylene glycol, dimethyl formamide and butanol. The mixed salts are precipitated by the neutralization with the appropriate base. We prefer to ammoniate the reaction product and to leach the ammoniated product to produce a 10–34–0 concentration with a minimum of about 50 to 60 percent of the total $P_2O_5$ value present as polyphosphate. It will be understood that various grades of polyphosphate-containing solutions may be obtained depending upon the manner of leaching the reaction product, as above described.

Specific examples illustrative of our process and product may be set out as follows:

Example I

A batch of 234 grams of anhydrous granular monocalcium orthophosphate was exposed to gaseous sulfur trioxide in a dry atmosphere. The solids were agitated and heated to 60–80° C. to initiate the reaction. The concentration (pressure) of the sulfur trioxide was controlled so as to maintain a reaction temperature between 100° and 250° C. The supply of sulfur trioxide was removed as soon as 80 grams had been absorbed. The reaction product at this point consisted of any oily semisolid which was extracted with 285 grams of 17% aqua ammonia. The extract contained the following polyphosphate distribution: ortho 25%, pyro 20%, tripoly 20%, tetrapoly 15%, pentapoly 10%, higher polyphosphate 10%.

Example II

The process was carried on as described in Example I except that the reaction was carried on in a vacuum. Comparable results were obtained.

Example III

Dry dicalcium phosphate (136 grams) was heated to 180° C. in a dry atmosphere. A stream of sulfur trioxide was passed into the agitated reaction vessel at a rate to maintain a reaction temperature between 180° and 300° C. The $SO_3$ introduction was discontinued as soon as 80 grams were absorbed. The resulting semi-solid produced, on extraction with 140 grams of a 17% aqua ammonia, a 10–34–0 solution containing the following polyphosphate composition: ortho 25%, pyro 10%, tripoly 10%, tetrapoly 10%, pentapoly 10%, hexapoly 10%, heptapoly 10%, higher polyphosphates 15%.

Example IV

The process was carried out as described in Example I except that instead of leaching the reaction product with aqua ammonia, the reaction product was first ammoniated and the ammoniated product was then leached with water. A product as described in Example I was obtained.

Example V

The process was carried out as described in Example I except that the reaction product was leached with cold water having a temperature below 30° C. The starting monocalcium orthophosphate was preliminarly heated at a temperature of about 120–130° C. to render the starting material anhydrous.

As heretofore stated, it is the present practice to react 54 percent $P_2O_5$ phosphoric acid with limestone and phosphate rock, respectively, to give dical and triple superphosphate. To obtain condensed phosphate solutions, the 54 percent $P_2O_5$ acid must be concentrated to 72 percent $P_2O_5$ acid. By the procedure described above and in the examples, condensed or polyphosphate species are obtained without having to concentrate such dilute (54 percent $P_2O_5$) phosphoric acid.

Example VI

The process was carried out as described in Example I except that the reaction product was leached with dimethyl formamide. The resulting acid extract was neutralized with anhydrous ammonia and the precipitated phosphate salts separated by filtration. The dried salts analyzed 16.98% N and 52.91% $P_2O_5$. The distribution of the phosphate species in the product was 15% ortho, 35% pyro and 50% higher polyphosphate polymers.

While in the foregoing specification we have set out specific procedure in considerable detail for the purpose of illustrating embodiments of the invention, it will be understood that such details may be varied widely by those skilled in the art without departing from the spirit of our invention.

We claim:

1. In a process for producing liberated polyphosphoric acid and calcium sulfate, the steps of heating a calcium phosphate containing chemically-bound water and selected from the group consisting of anhydrous monocalcium orthophosphate and anhydrous dicalcium orthophosphate in the presence of $SO_3$ to reaction temperature, whereby the limited amount of chemically-bound water in the phosphate on reaction with $SO_3$ produces a liberated polyphosphoric acid and calcium sulfate, and separating the phosphorus value from the calcium sulfate.

2. The process of claim 1 wherein the separation is by ammoniation of the reaction product and by leaching the ammoniated product.

3. The process of claim 2 in which the ammoniated product is leached with water.

4. The process of claim 1 in which the reaction product is leached with aqueous ammonium hydroxide.

5. The process of claim 1 in which the reaction product is leached with cold water.

6. In a process for producing liberated polyphosphoric acid and calcium sulfate, the steps of heating anhydrous monocalcium orthophosphate containing chemically-bound water in the presence of $SO_3$ to reaction temperature, whereby the limited amount of chemically-bound water in the phosphate on reaction with $SO_3$ produces a liberated polyphosphoric acid, and separating the phosphorus value from the calcium sulfate.

7. The process of claim 1 in which the phosphate heated to reaction temperature is dicalcium orthophosphate.

8. In a process for producing liberated polyphosphoric acid and calcium sulfate, the steps of heating a calcium phosphate selected from the group consisting of anhydrous monocalcium orthophosphate, and anhydrous dicalcium orthophosphate, in the presence of $SO_3$ to reaction temperature, agitating the phosphate material during said reaction in which polyphosphoric acid is liberated and calcium sulfate formed, and separating the phosphorous value from the calcium sulfate.

9. The process of claim 8 in which the $SO_3$ is added at a concentration to produce a reaction temperature of about 100–300° C.

10. The process of claim 8 in which the $SO_3$ is added in stoichiometric amounts.

11. In a process for producing liberated polyphosphoric acid and calcium sulfate, the steps of heating a calcium phosphate containing chemically-bound water and selected from the group consisting of anhydrous monocalcium orthophosphate and anhydrous dicalcium orthophosphate in the presence of $SO_3$ to reaction temperature, whereby the limited amount of chemically-bound water in the phosphate on reaction with $SO_3$ produces a liberated polyphosphoric acid and calcium sulfate, and recovering the phosphorous value in a leaching solution.

12. The process of claim 11 in which the reaction product is ammoniated and then leached with water.

13. The process of claim 11 in which the reaction product is leached with aqueous ammonium hydroxide.

14. In a process for producing liberated polyphosphoric acid and calcium sulfate, the steps of heating a calcium phosphate containing chemically-bound water and selected from the group consisting of anhydrous monocalcium orthophosphate and anhydrous dicalcium orthophosphate in the presence of $SO_3$ to reaction temperature, whereby the chemically-bound water produces a liberated polyphosphoric acid and calcium sulfate, and leaching the acid from the calcium sulfate with cold water.

15. The process of claim 1 in which the calcium phosphate is anhydrous monocalcium orthophosphate and the phosphate is heated to a starting temperature of at least 60° C.

16. The process of claim 1 in which the calcium phosphate is anhydrous dicalcium orthophosphate and the phosphate is heated at least to 180° C.

17. In a process for producing liberated polyphosphoric acid and calcium sulfate, the steps of heating a calcium phosphate containing chemically-bound water and selected from the group consisting of anhydrous monocalcium orthophosphate and anhydrous dicalcium orthophosphate in the presence of $SO_3$ to reaction temperature, whereby the limited amount of chemically-bound water in the phosphate on reaction with $SO_3$ produces a liberated polyphosphoric acid an calcium sulfate, and leaching the reaction product with an organic solvent selected from the group consisting of ethylene glycol, dimethyl formamide, and butanol.

18. The reaction product of $SO_3$ and anhydrous monocalcium orthophosphate, consisting essentially of a hygroscopic semi-solid body of calcium sulfate impregnated with liberated polyphosphoric acid and presenting an oily appearance.

19. The reaction product of $SO_3$ and anhydrous dicalcium orthophosphate, consisting essentially of a hygroscopic semi-solid body of calcium sulfate impregnated with liberated polyphosphoric acid and presenting an oily appearance.

References Cited

UNITED STATES PATENTS

| | | | |
|---|---|---|---|
| 1,878,997 | 9/1932 | Adelantado | 23—165 |
| 3,030,200 | 4/1962 | Harris | 23—165 |

FOREIGN PATENTS 601,717    7/1960    Canada.

EARL C. THOMAS, *Primary Examiner.*

L. A. MARSH, *Assistant Examiner.*